Figure 1:
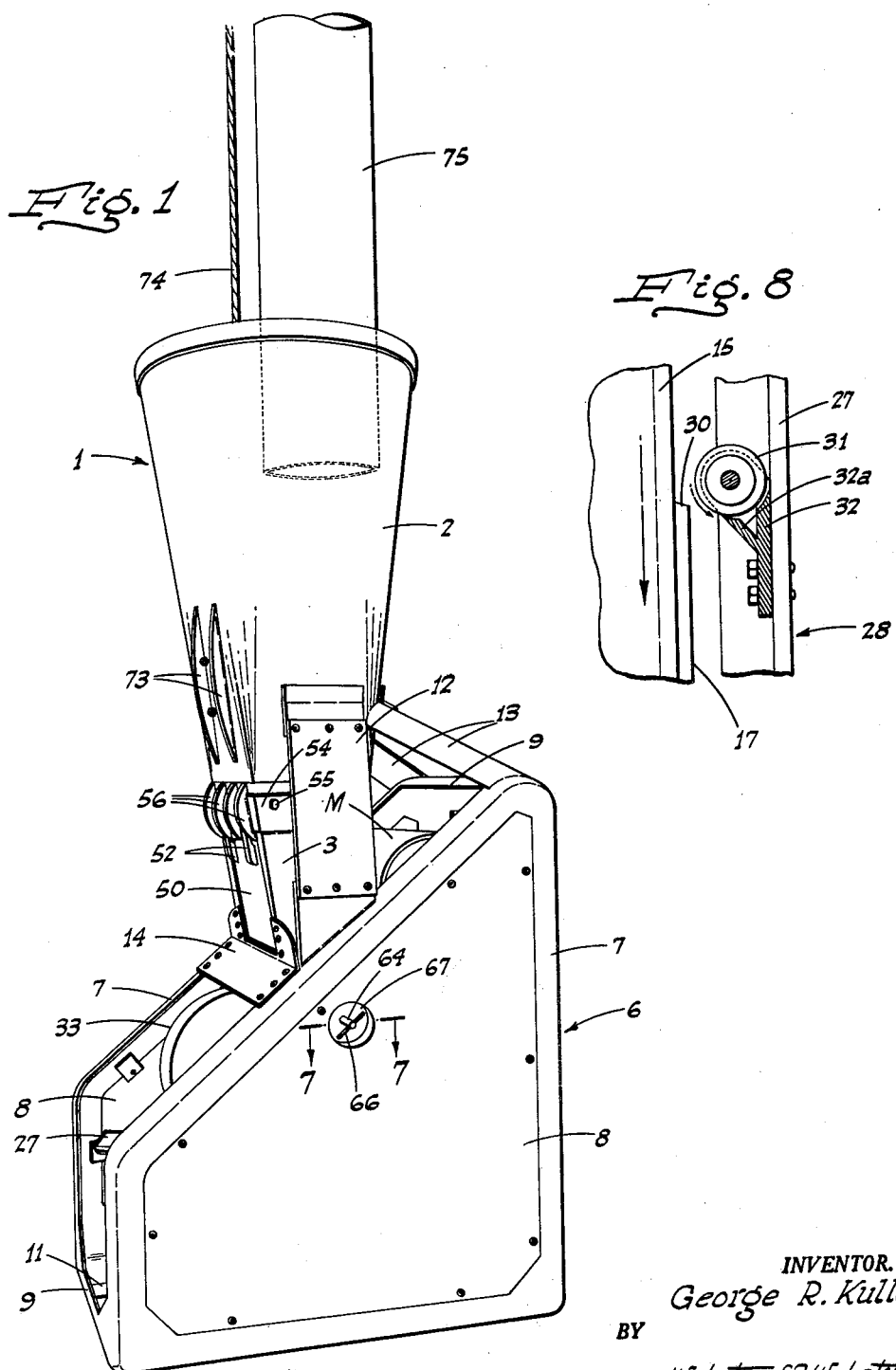

June 9, 1964  G. R. KULLA  3,136,405
BULK MATERIAL LOADING AND TRIMMING MACHINE
Filed June 26, 1962  5 Sheets-Sheet 1

INVENTOR.
George R. Kulla
BY
Webster & Webster
ATTYS.

June 9, 1964 — G. R. KULLA — 3,136,405

BULK MATERIAL LOADING AND TRIMMING MACHINE

Filed June 26, 1962 — 5 Sheets-Sheet 4

June 9, 1964  G. R. KULLA  3,136,405

BULK MATERIAL LOADING AND TRIMMING MACHINE

Filed June 26, 1962  5 Sheets-Sheet 5

3,136,405
BULK MATERIAL LOADING AND TRIMMING MACHINE
George R. Kulla, Stockton, Calif., assignor to U.S. Material Handling & Research Co., Inc., Stockton, Calif., a corporation of California
Filed June 26, 1962, Ser. No. 205,290
5 Claims. (Cl. 198—128)

This invention relates to machines for handling bulk materials such as grain, sand, and the like; iron and similar ores; and various other normally dry pulverulent material, for the purpose of loading such materials into the holds of ships, or to make stockpiles of the same on the outside.

The major object of the invention is to provide a machine for the purpose which, when suspended in the hold of a ship will enable such hold to be loaded with bulk material in an even manner and with the use of far fewer men to properly effect the loading than is necessary without the use of the machine.

Another object of the invention is to provide a machine for the purpose which will throw material into the hold clear of the machine, and having means whereby the material may be thus thrown different distances. A cargo hold may thus be "beamed up" without the machine changing its position in the hold, except for being occasionally turned, once it has been placed in the hold.

The machine includes a vertical chute into which the material to be thrown is fed, and which falls onto a driven thrower belt so arranged that material will be thrown therefrom with an upward trajectory, and another object of the invention is to provide means whereby the initial angle of such trajectory, and thus the length of throw of the material, may be easily and quickly altered and controlled.

A further object of the invention is to provide means, mounted in connection with the chute, whereby the width of the stream of material as delivered onto the thrower belt may be varied to suit different conditions.

The thrower belt is an endless member, mounted on end pulleys having bearings at both ends mounted in secondary frames supported from the main frame of the machine, and a still further object of this invention is to arrange and support the secondary frames in such a manner that the belt may be removed and replaced when necessary with a minimum of delay and without having to cut through the belt in order to effect such removal.

It is also an object of the invention to provide a practical, reliable and durable bulk material loading and trimming machine, and one which will be exceedingly effective for the purpose for which it is designed.

These objects are accomplished by means of such structure and relative arrangement of parts as will fully appear by a perusal of the following specification and claims.

Figure 2:
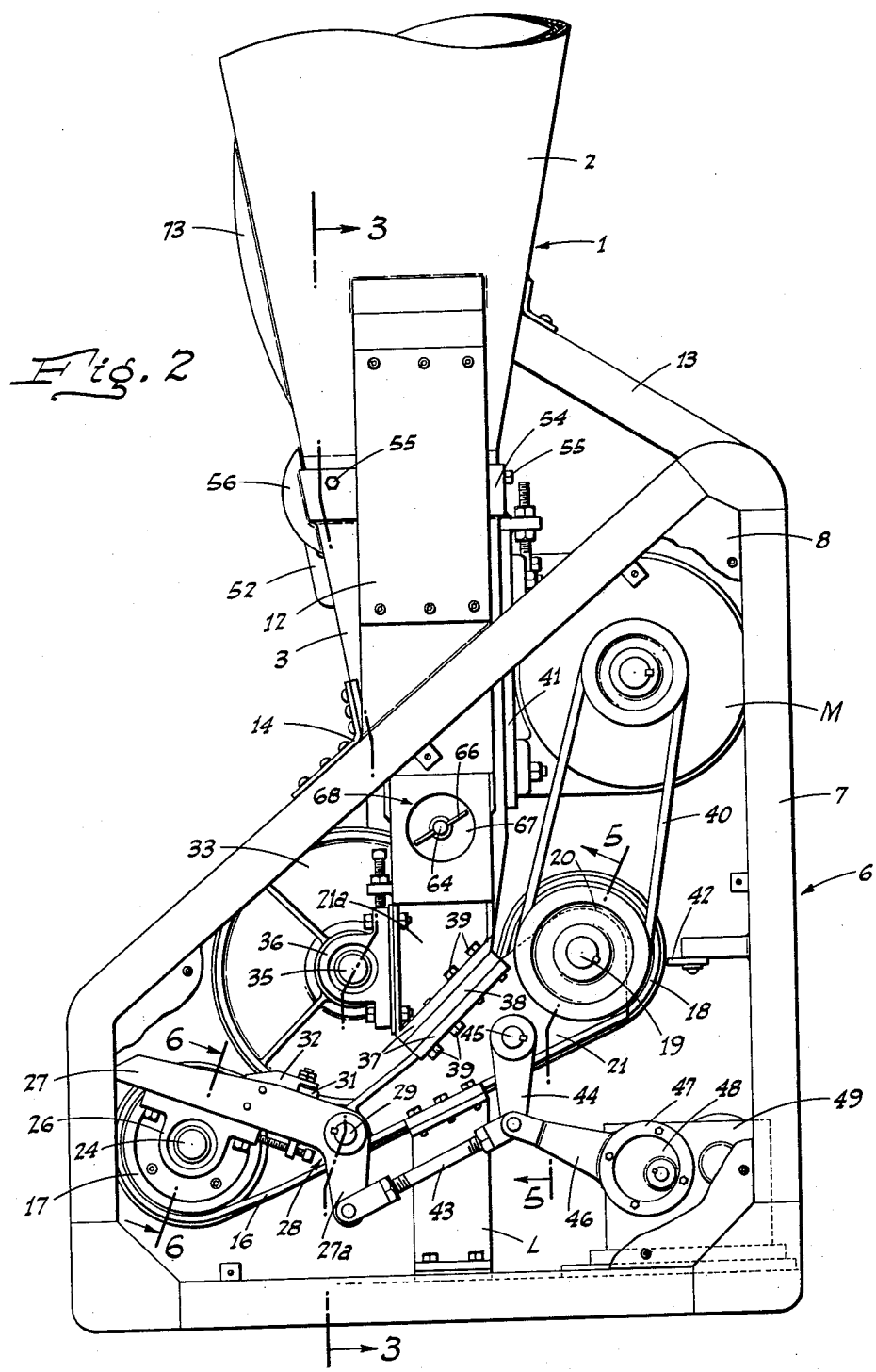
Figure 3:
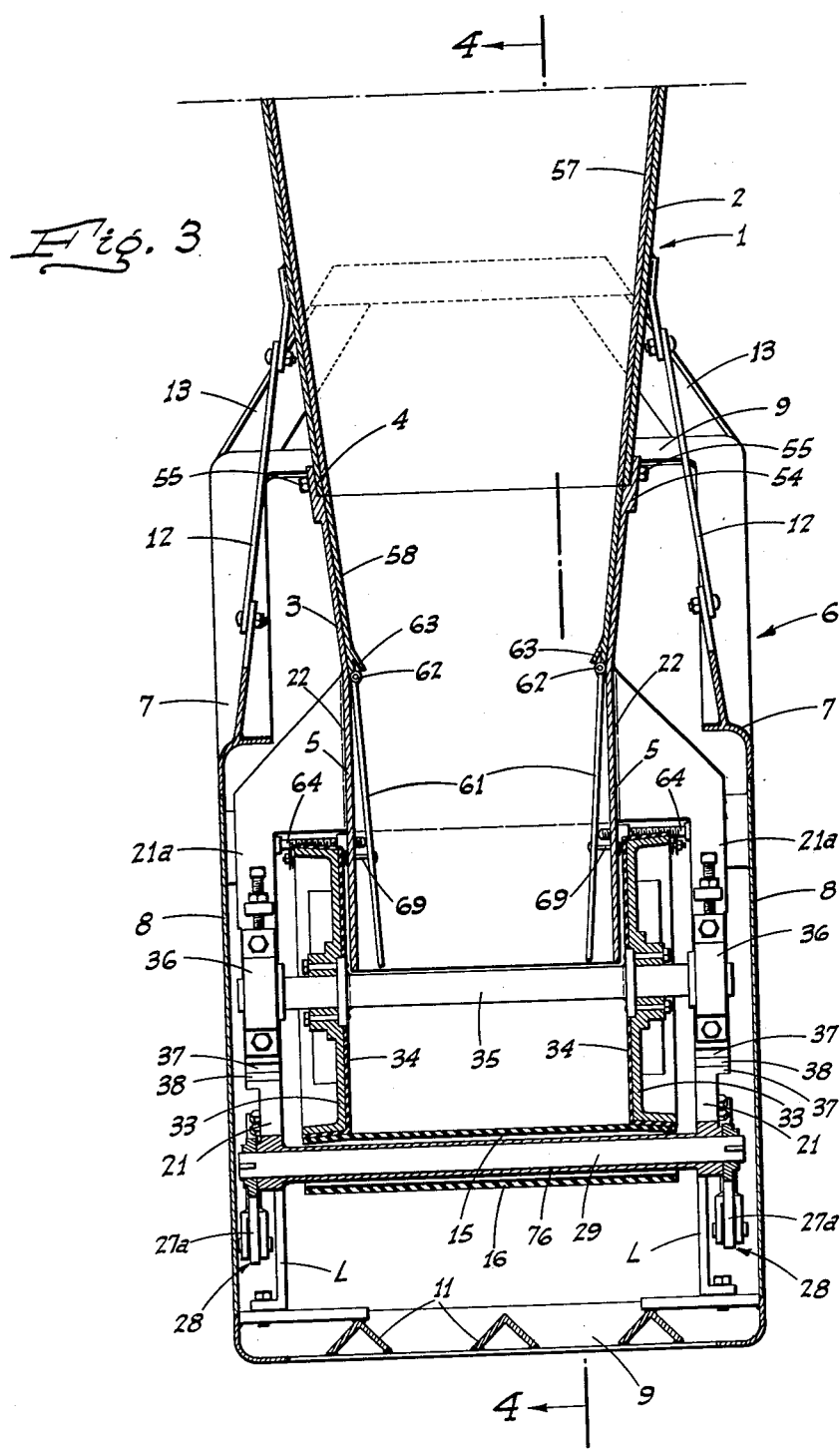
Figure 4:
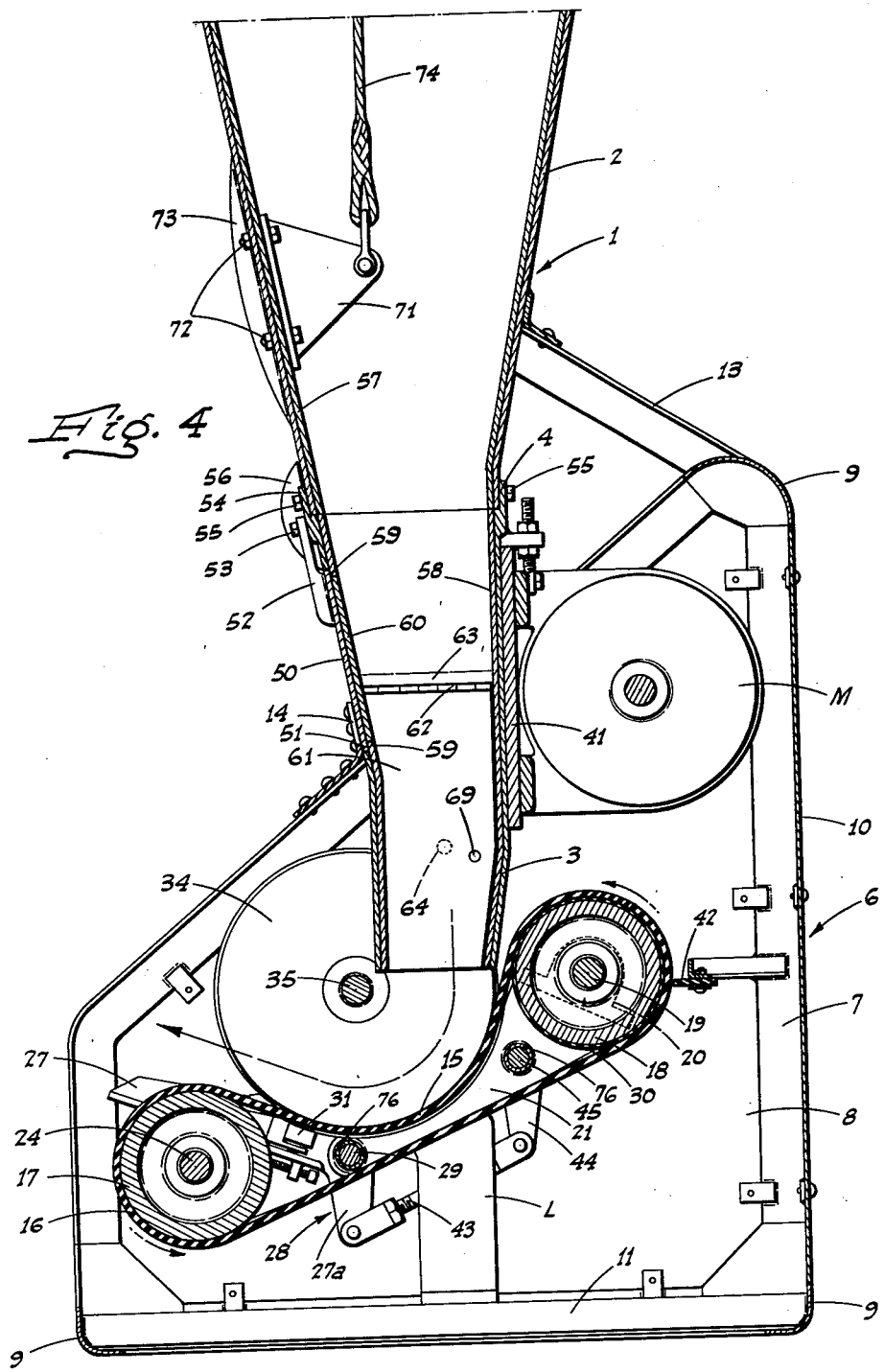
Figure 5:
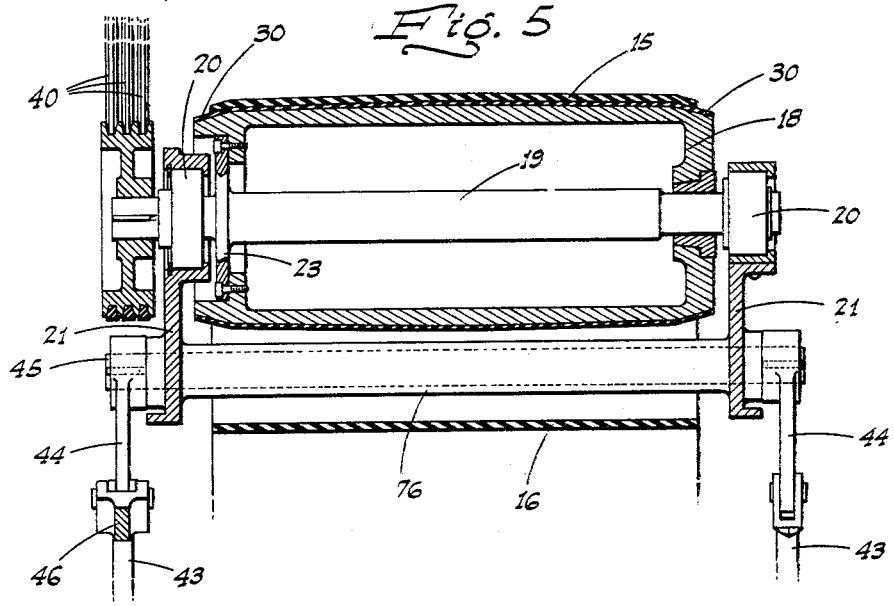
Figure 6:
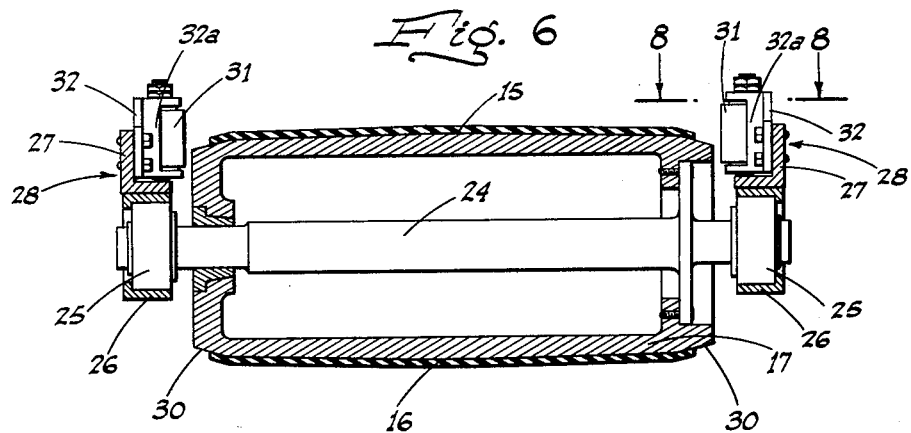
Figure 7:
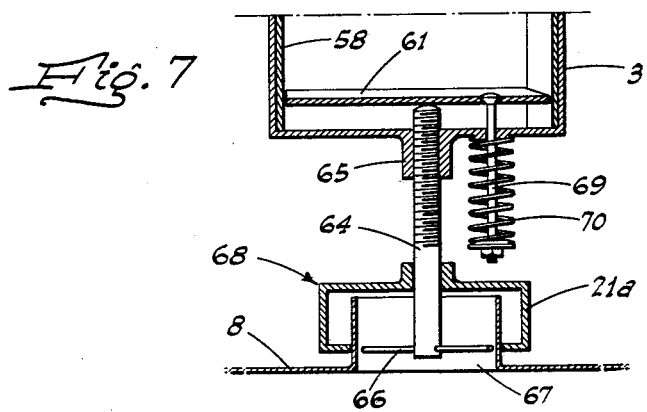

In the drawings:
FIG. 1 is a perspective view of the improved bulk loading and trimming machine.
FIG. 2 is an enlarged elevation of the machine, with the near cover panel of the frame mainly broken away.
FIG. 3 is a transverse vertical section taken substantially on line 3—3 of FIG. 2.
FIG. 4 is a sectional elevation of the machine taken substantially on line 4—4 of FIG. 3.
FIG. 5 is an enlarged fragmentary transverse section on line 5—5 of FIG. 2.
FIG. 6 is a similar view on line 6—6 of FIG. 2.
FIG. 7 is a fragmentary enlarged sectional plan view taken on line 7—7 of FIG. 1.
FIG. 8 is a fragmentary sectional plan view taken on line 8—8 of FIG. 6

Referring now more particularly to the drawings, and to the charatcers of reference marked thereon, the machine comprises a vertically elongated feed chute, indicated generally at 1, and which consists of initially separate upper and lower sections 2 and 3 respectively, and which are rigidly but detachably connected together at their adjacent ends in a suitable manner, as indicated at 4. The chute is of gradually tapering form to its lower end, being preferably circular in section at the upper part thereof, and rectangular in section along its lower portion; said circular and rectangular portions merging into each other, as shown in FIG. 1. Also, the chute at its lower end is wider in a transverse direction, as will be seen by comparing FIGS. 3 and 4; the transversely spaced lower sidewalls 5 of the chute section 3 being parallel to each other, as shown in FIG. 3.

The lower section 3 of the chute depends into and supports a frame structure, indicated generally at 6. This frame structure comprises transversely spaced side members, each of which includes a surrounding edge frame 7 of inwardly facing rounded-edge angle form in section, as shown in FIG. 3, and a removable panel 8 covering the area outlined by the frame. The sides and bottom of each edge frame 7 are vertical and horizontal respectively, while the top slopes downwardly to the front, as shown. The edge frames 7 are connected at the bottom and at the top at the back only by cross beams 9, also of rounded angle form in section, as shown in FIG. 4. The back area of the frame structure 6 between the side members is closed by a panel 10; the areas between said members in front of the chute being left open and unobstructed. Transversely spaced longitudinal rails 11 of inverted V-shape in section extend between the bottom cross beams 9 of the frame structure 6.

The upper section 2 of the chute is rigidly but detachably connected to the frame structure 6 by tension and brace strap units 12 at the sides of the chute and depending to connections with the top of the edge frames 7 intermediate the front and rear ends thereof. Brace bars 13 extend upwardly and diagonally from the rear upper ends of the edge frames 7 to connections with the upper chute section 2 at the back. At the front of the chute 1, the lower section 3 thereof is rigidly connected to the top of edge frames 7 by a cross angle member 14.

The lower chute section 3 at its lower end discharges onto the upper run 15 of an endless belt 16 of rubber or similar material which is trained about front and rear pulleys 17 and 18 respectively. The rear pulley 18, which is faced with rubber so as to have a non-slip driving grip with the belt, is dipsosed close behind the chute with its axis approximately on a level with the bottom of the chute, as shown in FIG. 4.

The shaft 19 of rear pulley 18 is journaled in bearings 20 supported in the main elongated portions of secondary frames 21 disposed laterally inward of the adjacent edge frames 7, and which frames 21 include relatively narrow extensions 21a upstanding from the main portions and extending to and secured against the sides of the chute section 3, as at 22. In order to stabilize the frames 21 and reduce vibration, legs L depend from and are removably bolted to said frames and to the frame structure 6 at the bottom thereof.

The shaft 19 is rigidly connected adjacent one end to an enlarged flange 23 which is bolted to the pulley 18 adjacent the corresponding end thereof, as shown in FIG. 5. This enables the pulley to be cast in hollow form, and to be then machined on the inside so that perfect balance may be obtained before the shaft is applied to the pulley.

The shaft 24 of the pulley 17, which is near the front of the frame structure 6 and a considerable distance below the level of the pulley 18, is journaled in bearings 25 which are mounted in cages 26 adjustably supported from the generally horizontal and relatively long arms 27 of bellcranks 28. These bellcranks are disposed adjacent and laterally out from the secondary frames 21, and are fixed on the ends of a cross shaft 29 journaled in said frames. When the machine is in operation the bellcranks may be swung by means which will be described later.

The pulley 17, which is an idler, is hollow and machined internally for perfect balance, and the shaft 24 is connected thereto in the same manner as was described in connection with the shaft 19 of pulley 18, as clearly shown in FIG. 6. The pulleys 17 and 18, which are of course somewhat wider than the mouth or lower end of the chute 1, are both crowned, as is usually done to maintain the endless belt 16 centered. In addition, the side edge portions 30 of the pulleys, and which are engaged by the corresponding portions of the belt, are cut on a taper greater than that of the normal crowning taper of the pulleys, as shown in FIGS. 5 and 6. Even with these precautions it has been found that when handling certain kinds of bulk material the belt will drift laterally near its discharge end. To prevent such drift, when it occurs, from becoming excessive a roller 31 is mounted on each bellcrank arm 27 a short distance back from the pulley 17 in facing relation to the belt, and with its axis at right angles to the adjacent portion of the upper run 15 of the belt, as shown in FIG. 4. Each roller 31 is journaled in a supporting bracket 32 which includes a roller engaging scraper blade 32a to keep the roller smooth should it be rotated by contact with the belt and tend to become fouled by wet material being handled.

Between the pulleys 17 and 18, the side edge portions of the upper run 15 of the belt 16 are engaged by narrow large-diameter belt deforming idler pulleys or wheels 33 which cause said upper run to have a deeply dished or concaved form for practically the full distance between the end pulleys 17 and 18, as clearly shown in FIG. 4. The pulleys 33 are solid faced on their inner sides, and said sides, as well as their peripheral faces, are faced with rubber, as shown at 34 in FIG. 3.

In connection with such peripheral faces it will be noted that they are tapered in a laterally inward direction to conform to the slope naturally assumed by the side edge portions of the belt run 15 engaged by said rollers. The belt deforming pulleys 33 are positioned laterally out from but close to the sidewalls of the lower portion of the chute, and which sidewalls are lapped by said pulleys. A confining pocket for the material passing down the chute is thus provided by the upper run of the belt 16 and the pulleys 33, and which pocket is open only at its forward end, since said upper run 15 of the belt at the back or rear end of the pocket passes relatively close to the back wall of the chute, as shown in FIG. 4.

The pulleys 33 are mounted on a cross shaft 35 which is journaled at its ends in bearing cages 36 vertically adjustably supported from the adjacent upstanding extensions 21a of the secondary frames 21. Each extension 21a at the bottom, and the corresponding main portion of the frame 21 at the top, are formed with matching parallel flanges 37 spaced apart a distance greater than the thickness of the belt 16 and disposed at a downward slope to the front approximating that of the rear portion of the upper run 15 of said belt. The above mentioned space is normally filled by a filler plate or block 38; the flanges 36 and plate 38 being rigidly but detachably connected together by bolts 39. The purpose of this arrangement will be seen later.

The pulley 18 is driven at high speed in a direction to move the upper run of the belt 16 forwardly by means of an electric motor M which is connected to one end of the shaft 19 by a multiple-belt drive 40. The motor M is disposed within the confines of the frame structure 6, and is vertically adjustably mounted on a rigid vertical plate 41 which is secured against the back side of the lower chute section 3. It may here be noted that a transverse scraper or cleaner blade 42 is supported from the edge frames 7 behind the rear pulley 18 in position to keep the outer surface of the belt 16 clean should any material adhere thereto.

The relatively short depending arms 27a of the bellcranks 28 are connected by links 43 to similar parallel arms 44 which are secured on the ends of a cross shaft 45 journaled in the secondary frames 21 some distance rearwardly from cross shaft 29; both said shafts being disposed between the upper and lower runs of the belt 16. One arm 44 at its outer end is connected to the arm 46 of an eccentric strap 47, the strap-engaging eccentric 48 being turned when desired by an electric motor and reduction gear unit, indicated at 49, and mounted in the frame structure 6 adjacent the bottom thereof.

The links 43 are adjustable as to their length, as shown, so that the tension of the belts may be adjusted irrespective of the position of the eccentric 48. The specific connection means between the eccentric strap and the bellcranks as recited prevents any possible misalining of the pulley supporting arms of the bellcrank, with the use of only a single eccentric unit.

Reverting now to certain features of construction of the chute 1, it will be seen that the front wall of the lower chute section 3, above the top of the frame members 7, is provided with an access door 50 for inspection or clean-out purposes. The upper leg of the cross angle member 14 is cut away to mainly clear the door, as clearly shown in FIG. 1; the lower edge of the door seating just below the cut-away portion of said member 14, as shown at 51 in FIG. 4.

Transversely spaced ribs 52 project upwardly from the outer face of the door to a point some distance above the door so as to enable the ribs to be detachably bolted, as at 53, to the stiffening collar 54 which surrounds the lower chute section 3 at the top and serves to also locate the upper chute section 2 in place relative to the lower section 3 and to which the upper section 2 is detachably bolted, as shown at 55.

In order to prevent possible damage being done to the exposed heads of the bolts 53 and the heads of the adjacent front bolts 55, the collar 54 is provided with upstanding protecting ribs 56 on opposite sides of the upper portions of the ribs 52, but which do not interefere with the removal of the door 50 when the bolts 53 are withdrawn.

The upper chute section 2 is provided with a replaceable wear liner 57, while the lower section 3 is provided with a similar liner 58. This last named liner, on the front side of the chute section, overlaps the peripheral edges of the door, as shown for instance at 59 in FIG. 4, and which prevents the door from moving inwardly of the chute; said door also having a liner 60 which is flush with the liner 58.

As shown particularly in FIG. 3, the liner 58 on the sides terminates some distance below the lower end of the chute section 3, or approximately at the upper end of the parallel wall portions 5 of said section.

From this point to the lower end of the chute section 3, deflector plates 61 take the place of the side liners 58. These plates are hinged along their upper edges, as at 62, to the chute walls at the base of the side liners 58; the hinges being protected from above by overhanging flanges 63 on the adjacent liners along their lower edges, as shown in FIG. 3.

Each plate 61 is engaged intermediate its side edges and ends by one end of a hand adjusting screw 64, which is threaded through a boss 65 on the adjacent liners along their lower edges, as shown in FIG. 3. Each plate 61 is engaged intermediate its side edges and ends by one end of a hand adjusting screw 64, which is threaded through a boss 65 on the adjacent side of the chute section 3. This screw on its outer end is provided with a cross bar 66 or the like whereby the screw may be readily hand-turned; this bar being exposed through an opening 67 in the adjacent side panel 8 of the frame structure 6, said cross bar being radially inward of said panel, as clearly shown in FIG. 7.

In addition to the support afforded the screw 64 by its engagement with the boss 65, said screw is turnably engaged by the bottom of a cage 68 which surrounds the opening 67 and which is actually part of the extension 21a. A rod 69, parallel to the screw 64, is secured to the plate 61 to one side of said screw, and slidably projects through the adjacent side wall of the chute section 3. Laterally out from said wall, a compression spring 70 is mounted on the rod in a manner to exert a laterally outward pull thereon, and thus on plate 61 as well.

In order to support the machine in suspended relation from a cargo boom or the like, a heavy ear 71 projects into the chute section 2 intermediate the ends thereof and on the same side as the door 50, as shown in FIG. 4. In order that the adjacent liner 57 may be replaced when necessary, the ear 71 is removably secured in place by bolts 72, the nuts of which are on the outside of the chute 1, and are protected by vertically elongated ribs 73 secured to the outside of said chute.

A suspension cable 74 is attached to the ear 71, said ear and the cable being arranged so as not to interfere with the placing of one end of a feed spout 75 into the chute, as shown. The distribution of weight of the parts of the machine is such relative to the point of connection of the suspension cable with the ear that the machine will be held with the chute 1 vertical and the bottom rails 11 of the frame structure 6 substantially horizontal, or—in other words—in a position of proper balance.

In operation, the machine is lowered into the hold of a ship to be loaded through the usual hatch opening, and the bulk material is discharged into the chute 1 from the spout 75, and which chute delivers into the pocket formed between the pulleys 33 and the upper run 15 of the belt 16. The width as well as the volume of material thus deposited on the belt may be varied at will by the operator by adjusting the plates 61 in or out, so that the width and volume of the stream thrown from the belt may be varied.

The upper run of the belt having an upward slope to its forward end and moving at a high speed, the material leaves the belt with considerable speed and with an initially upward trajectory, and the distance the material will be thrown—without altering the speed of the belt—may be altered by operating the motor unit 49. Such operation, which is controlled from a remote point, causes the front belt pulley 17 to be raised or lowered; thus increasing or decreasing the angle of upward slope of the forward end portion of the upper run of the belt, and consequently the trajectory of the material as thrown. By reason of this arrangement, and since the machine is capable of being rotated from above the hold, the usual rectangular hold area may be readily loaded and so that the load will be substantially level along the sides as well as in the corners of the hold.

Whenever the belt 16 needs to be replaced this can be done, without having to dismantle the entire belt supporting structure, in the following manner:

The spacer plate 38 on that side of the machine which is opposite the eccentric arm 46 and the belt 40 is removed, as well as the adjacent leg L. Upon the cages 26 of the bearings of pulley 18 being adjusted to loosen the belt 16, the upper run 15 of the belt may then be withdrawn through the gap provided by the removal of the spacer 38—upon said upper run being first disengaged from the adjacent pulley 33—and the lower run of the belt is lowered sufficiently to move under the adjacent link 43 while the belt is at the same time being slid transversely off the pulleys 17 and 18.

This last operation is facilitated by reason of the fact that the lower edge of the frame 21 is substantially parallel to and adjacent the level of the lower run of the belt 16.

The replacement belt is of course mounted in the same manner, but with reverse movements.

While the above belt change operations are being effected, the then floating frame 21 is maintained rigid because of its connection with the opposite frame 21 by the sleeves 76 which surround the shafts 29 and 45 and are rigid with the frames 21.

It is to be noted that all the corners of the mechanism-enclosing framework of the machine are smooth and rounded, so that the chance of any corner of such framework becoming caught or hung up by hatch-opening beams or other rigid exterior members is reduced to a minimum. Also, the machine is constructed so that its width and length are such relative to standard ship hatch openings, and the cross beams thereof, that the frame structure 6—which is the widest part of the machine—may pass between such beams, or the edge coping of the hatch, without interference.

It should be noted that at times it may be desired to support the machine directly on the load. By reason of the use of the V-shaped base beams on the frame structure the machine when supported thereon will not tend to sink into the load, or shift transversely thereon.

While the machine above described has been initially designed for use in ship-hold loading, it is also admirably adapted—with few, if any, mounting modifications—for warehouse work, outside stockpiling, and other bulk-material handling operations.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. In a bulk-material loading machine which includes a generally horizontal endless driven thrower belt, a feed chute above and discharging onto the upper run of the belt, front and rear pulleys about which the belt is trained, means connected to the rear pulley to drive the same, side frames supporting the rear pulley, bellcranks pivoted on the frames and including generally horizontal arms projecting forwardly from the pivots, and on the forward ends of which the front pulley is journaled, and relatively short arms depending from the pivots; another pair of relatively short arms generally parallel to the first named short arms rearwardly thereof, means pivoting the last named arms as a rigid unit in the frames, links connecting the ends of the corresponding pairs of arms, and an optionally driven eccentric unit which includes an eccentric strap extending at an acute angle and connected to the outer end of one of the last named arms.

2. A structure, as in claim 1, in which the links are individually adjustable as to their operative length.

3. In a bulk-material loading machine which includes a generally horizontal endless driven thrower belt, a feed chute above and discharging onto the upper run of the belt, a rigid frame structure in which the belt and chute are mounted, said structure including side members having cross beams at the front and back at the bottom and leaving an opening therebetween at the bottom, and transversely spaced beams extending between and secured to said cross beams and over said opening, the last named beams being of inverted V-shape form in cross section.

4. A bulk material loading machine comprising a generally vertical chute to receive material therein from a source of supply, a driven thrower belt onto the upper run of which the chute at its lower end delivers, horizontally spaced end pulleys about which the belt passes, frames at the sides of and from which the pulleys are supported and rigidly connected together between the runs of the belt, said frames being connected at their upper ends to the sides of the chute, a mounting frame structure which includes side members laterally out from the frames and supported by and depending from the chute, said members extending to a bottom level below the frames, and legs extending between and secured to the frames and to the bottom of the side members intermediate the ends thereof.

5. A bulk material loading machine comprising a generally vertical chute to receive material therein from a source of supply, a driven thrower belt onto the upper run of which the chute at its lower end delivers, horizontally spaced end pulleys about which the belt passes, frames at the sides of the pulleys, the frames each comprising a main frame section from which the pulleys are supported, a relatively narrow upstanding extension rigidly connected at its upper end to the adjacent side of the chute, and a rigid relatively narrow section depending from the main section, said sections being normally connected together in rigid relation; the frame on one side of the machine including a filler plate inserted between and detachably connected to the corresponding main section and extension section, said filler plate being positioned and arranged so that, when detached, a gap is left between said frame sections of a width sufficient to receive the upper run of the belt therethrough.

References Cited in the file of this patent
UNITED STATES PATENTS

| | | |
|---|---|---|
| 447,072 | Huntley | Feb. 24, 1891 |
| 1,988,676 | Andreas | Jan. 22, 1935 |
| 2,568,174 | Staarke | Sept. 18, 1951 |
| 2,687,798 | Landrey | Aug. 31, 1954 |
| 2,909,392 | Rees | Oct. 20, 1959 |
| 2,950,808 | Gerberich | Aug. 30, 1960 |
| 2,966,065 | Renner | Dec. 27, 1960 |
| 3,039,594 | Lucas | June 19, 1962 |